United States Patent [19]

Moores et al.

[11] Patent Number: 4,913,204

[45] Date of Patent: Apr. 3, 1990

[54] POWER BISCUIT JOINTER CUTTER

[75] Inventors: Gregory E. Moores, Reisterstown; Scott D. Price, Pylesville, both of Md.

[73] Assignee: Black & Decker Inc., Newark, Del.

[21] Appl. No.: 413,939

[22] Filed: Sep. 28, 1989

[51] Int. Cl.$^4$ .............................................. B27M 1/00
[52] U.S. Cl. .................................. 144/136 C; 30/374; 30/377; 83/875; 144/134 D; 144/371; 408/115 R; 409/182
[58] Field of Search ........................ 30/374, 377, 375; 83/875; 144/136 R, 136 C, 371; 409/182, 178, 130; 408/72 R, 72 B, 115 R, 115 B

[56] References Cited
U.S. PATENT DOCUMENTS

| 906,724 | 12/1908 | Koester . | |
|---|---|---|---|
| 4,545,121 | 10/1985 | Armbruster et al. . | |
| 4,615,654 | 10/1986 | Shaw | 144/134 D X |
| 4,674,548 | 6/1987 | Mills et al. | 409/182 X |
| 4,858,661 | 8/1989 | Bosten et al. | 144/134 D |
| 4,858,662 | 8/1989 | Bosten et al. | 144/136 C |
| 4,858,663 | 8/1989 | Bosten et al. | 144/136 C |

FOREIGN PATENT DOCUMENTS 0062253 10/1982 European Pat. Off. .
2838233 6/1979 Fed. Rep. of Germany .

OTHER PUBLICATIONS

Lamello Pamphlet (general).
Lamello Top 10 Pamphlet.
Six Polaroid Photos of a Lamello Depth of Cut Adjustment Mechanism.
Five Polaroid Photos of the Lamello Top 10 Depth of Cut Mechanism.

Primary Examiner—W. Donald Bray
Attorney, Agent, or Firm—Dennis A. Dearing; Charles E. Yocum; Edward D. C. Bartlett

[57] ABSTRACT

A biscuit jointer cutter for making segment shaped cuts by plunge cutting has a shoe assembly reciprocally movable relative to a housing containing a motor. The shoe assembly houses a cutter blade rotatably driven by the motor, and has a front opening through which the blade is movable in a forward direction for cutting and retractable in a rearward direction after cutting. A fence assembly is mounted on the shoe assembly above the front opening. The fence assembly is adjustably movable upwardly and downwardly relative to the front opening by means of a rack and pinion mechanism, and also has a fence adjustably pivotable through 90 degrees. A depth of cut adjustment mechanism is operatively connected between the shoe assembly and the housing, and includes a movable rod cooperative with a stop. The stop is a turret selectively rotatable about an axis eccentric of the rod and having recesses of different axial length. A single spring surrounds the rod and functions to both bias the blade to retract and to yieldably latch the turret stop in selected positions. The shoe assembly has a pivotally attached shoe to expose a blade chamber and the blade.

38 Claims, 8 Drawing Sheets

POWER BISCUIT JOINTER CUTTER

FIELD OF THE INVENTION

This invention relates to power biscuit jointers for plunge cutting slots in workpieces.

BACKGROUND OF THE INVENTION

Joints between two members, e.g. two pieces of wood when making furniture, can be made by gluing a biscuit-like wafer in the two members. To do this, a similar sized slot is made in each member and glue is applied in the slots and/or on the biscuit-like wafer. The wafer is inserted in one slot to half the extent of the wafer, and then the two members are presented to each other so that the other half of the wafer engages in the other slot. The two members are then clamped together until the glue sets. If desirable, several such biscuit wafers can be inserted through the joint at spaced apart locations, all such wafers being partly assembled before the two members are clamped together.

A function of the biscuit wafers is to locate the two members more accurately in the joint, the main strength of the joint possibly still relying on gluing the two members together.

Portable power tools have been developed for making the plunge cuts to accept the biscuit wafers. Such tools may be referred to as biscuit jointers or power biscuit jointer cutters or plate jointers.

The biscuit jointers on the market, although functioning satisfactorily, tend to lack the degree of versatility and convenience of use that users desire.

SUMMARY OF THE INVENTION

The present invention is concerned with improving biscuit-jointers, particularly as regards versatility and convenience of use.

The present invention is particularly concerned with features affecting fence adjustment and versatility, depth of cut adjustment, and accessibility of the blade chamber.

Some aspects of the present invention are also concerned with ease of assembly of the tool and cost of its manufacture.

Accordingly, therefore, there is provided by one aspect of the invention a biscuit jointer cutter having a housing containing a motor, a shoe assembly containing a cutter blade rotatably driven by the motor, and the shoe assembly having an opening through which the blade is protrudable in a forward direction and retractable in a rearward direction. The housing and the shoe assembly are movable to and fro relative to each other to cause the blade to protrude through and be retracted back through the opening, the blade being so movable in a cutting plane. A fence assembly comprises a guide plate secured to the shoe assembly, a carrier movably mounted on the guide plate for adjustment away from and towards the cutting plane, and a fence pivotally mounted on the carrier to pivot about a pivotal axis. This pivotal axis is located rearward of the shoe assembly opening. The fence is pivotal between an extended position parallel to the cutting plane and a withdrawn position at right angles to the cutting plane, the fence in its withdrawn position not protruding in the forward direction beyond the shoe assembly opening.

Preferably, the carrier is slidably mounted on the guide plate for movement at right angles to the cutting plane.

Means may be provided for moving the carrier on the guide plate to effect adjustment of the carrier. Preferably, the moving means comprises a rack and pinion mechanism. Advantageously, the pinion can be elongate and extend fully across the guide plate, and the guide plate may have rack teeth which engage opposite end portions of the pinion.

The fence preferably has a front face on a fence body and rearwardly displaced legs, distal ends of which are pivoted. Preferably, these distal ends are located in cavities in a front wall of the shoe assembly, and the legs cause the pivotal axis to be located rearwardly of the fence body.

A depth of cut adjustment mechanism may comprise a rod movable in unison with one of the shoe assembly and the housing and slidable with respect to the other. A turret stop may be provided rotatable about a rotational axis parallel to but eccentric of the rod. The turret stop may have a plurality of stop recess of different length in a direction parallel to the rotational axis, with each stop recess selectively alignable with the rod to provide different stop positions of the rod when the blade is caused to protrude through the shoe assembly opening.

According to another aspect of the invention, there is provided a biscuit jointer cutter comprising a housing supporting a motor, a shoe assembly enclosing a cutter blade driven by the motor, and the shoe assembly having a front opening through which the blade is movable in a forward direction for cutting and retractable in a rearward direction after cutting. The housing and the shoe assembly are slidably movable relative to each other to effect the blade moving out through the opening for cutting and retracting after cutting. A depth of cut adjustment mechanism is operatively connected between the shoe assembly and the housing. This mechanism has a stop member movable to selected positions to adjust the distance the blade can move out through the opening for cutting, a latch member yieldably latching the stop member in these selected positions. A spring resiliently biases the latch member to effect latching. The spring is operatively connected between the shoe assembly and the housing to also urge the blade to retract in the rearward direction.

Preferably, the stop member is rotatable about an axis parallel to but eccentric of a cooperating rod. The stop member may have slot-like axial cavities around its periphery, these cavities each being open on the outward peripheral side.

Advantageously, a free end of the rod is engageable with the stop, and the opposite end of the rod is adjustably screwed into the shoe assembly or the housing for altering the length of the rod extending therefrom.

According to yet another aspect of the invention, there is provided a biscuit jointer cutter having a shoe assembly comprising a base with a blade chamber for housing the cutter blade, a shoe extending across this blade chamber and upon which the biscuit jointer cutter can be supported, the shoe being pivotally attached to the base and being pivotal between positions closing and opening the blade chamber, and means for securing the shoe in the closed position.

Preferably, the securing means comprises at least one screw.

The shoe may have two screw holes located outside the base on opposite sides thereof for attaching the shoe with fasteners to a work surface to convert the cutter to a bench tool.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings, in which like reference characters indicate like parts.

DETAILED DESCRIPTION OF THE PREFERRED EMBODIMENT

The preferred embodiment of the invention is illustrated in FIGS. 1 to 6 with further detail thereof being shown in FIGS. 7 to 12.

This preferred embodiment is a biscuit jointer, and is used to make segment shaped slots in a workpiece by a guided plunge-cutting action of a rotating cutter blade.

Figure 8:
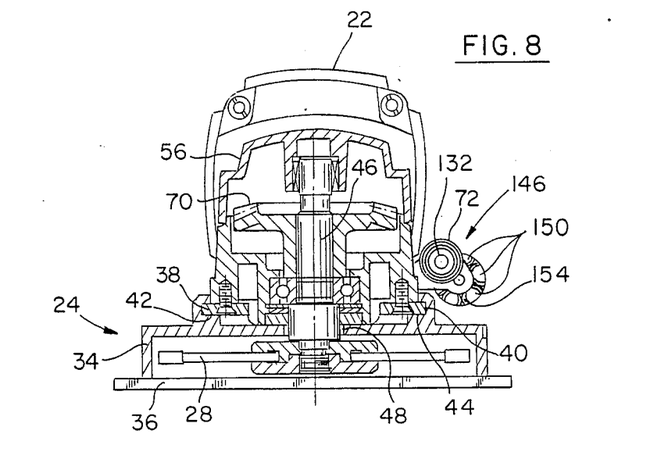
FIG. 8 is a diagrammatic section on the line 8—8 of FIG. 2.

An initial general understanding of the portable power tool can be quickly gleaned from FIGS. 1, 2, 3 and 8 in which the biscuit jointer 20 has a motor housing 22, a base and shoe assembly 24 which slidably receives the motor housing 22, and a fence assembly 26. The base/shoe assembly 24 is slidable back and forth relative to the motor housing 22 to expose and conceal, respectively, the disk-like cutter blade 28 through a transverse slot-like opening 30 in the front wall of a blade chamber 32 formed by base 34 and shoe 36. As shown in FIG. 8, motor housing 22 includes a pair of gibs or key-like flanges 38, 40 which are slidably received within groove-like ways 42, 44 formed longitudinally in the base/shoe assembly 24. The cutter blade 28 is mounted on a drive shaft 46 which passes through a longitudinally extending slot 48 in top of the base 34.

Figure 1:
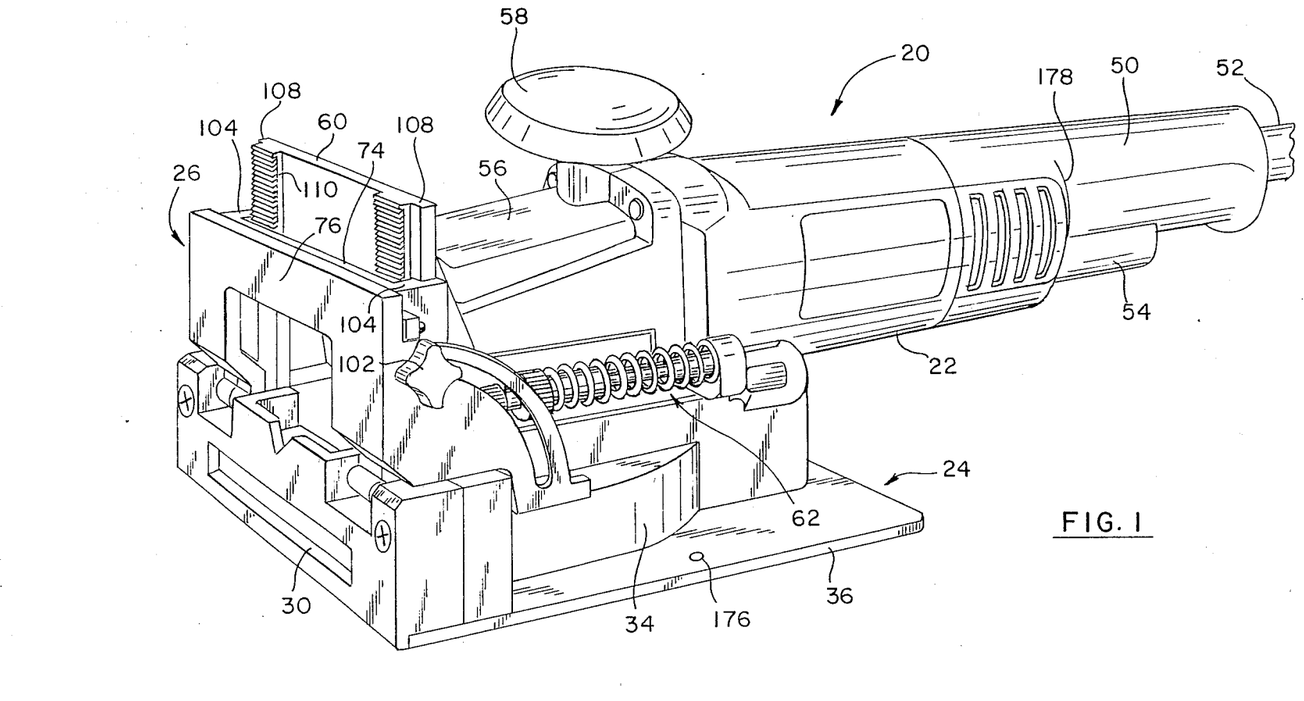
FIG. 1 is a perspective view of a hand-held power biscuit jointer according to the invention.

FIG. 1 shows a rear handle 50 extending rearwardly from the motor housing 22, the handle 50 having an electric cord 52 attached and an on/off trigger switch 54. A gear compartment 56 is defined at the forward end of the motor housing 20 and extends downwardly to slidably engage with the base 34. A handgrip knob 58 is mounted on top of the gear compartment 56 and forms an upper, forward handle. A guide plate 60, upon which the fence assembly 26 is vertically adjustably mounted, is rigidly secured to the front wall of the base 34 and moves with the base 34 relative to the motor housing. A depth of cut adjustment mechanism 62 is operatively connected between the guide plate 60 and the motor housing 22.

Figure 2:
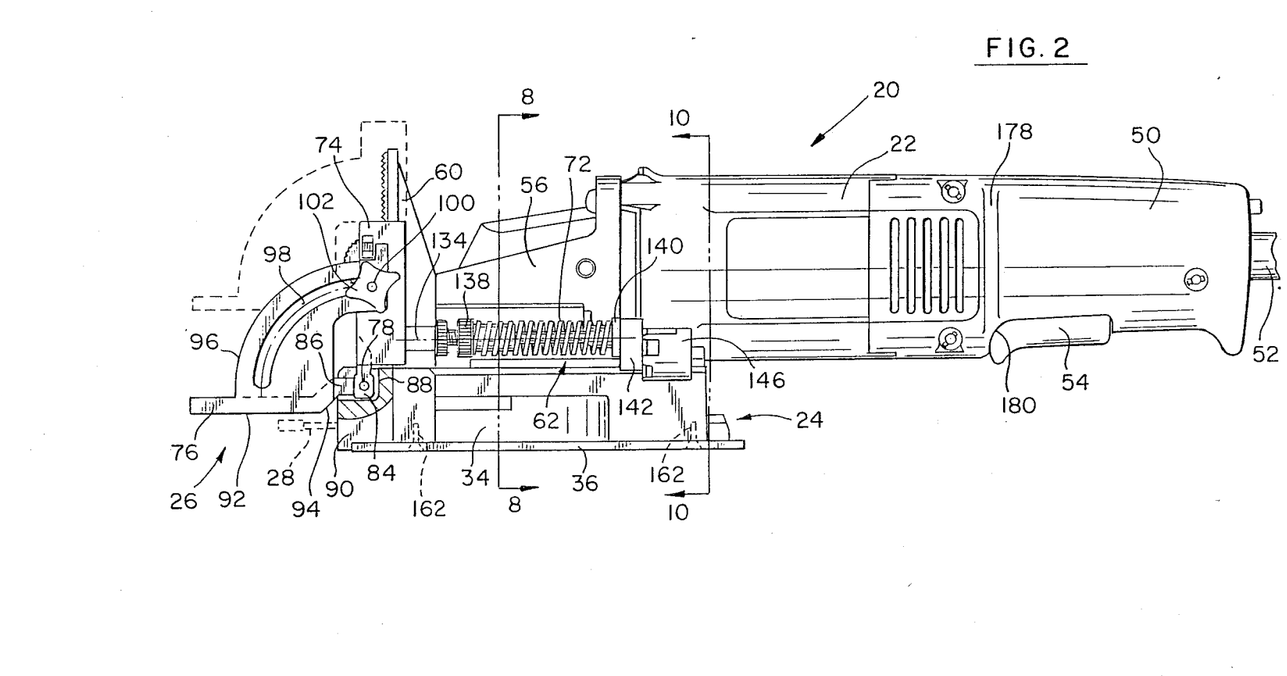
FIG. 2 is a side elevational view of the biscuit jointer of FIG. 1 with an adjustable fence in a lowered and forwardly extending position and an upper handgrip omitted.
Figure 3:
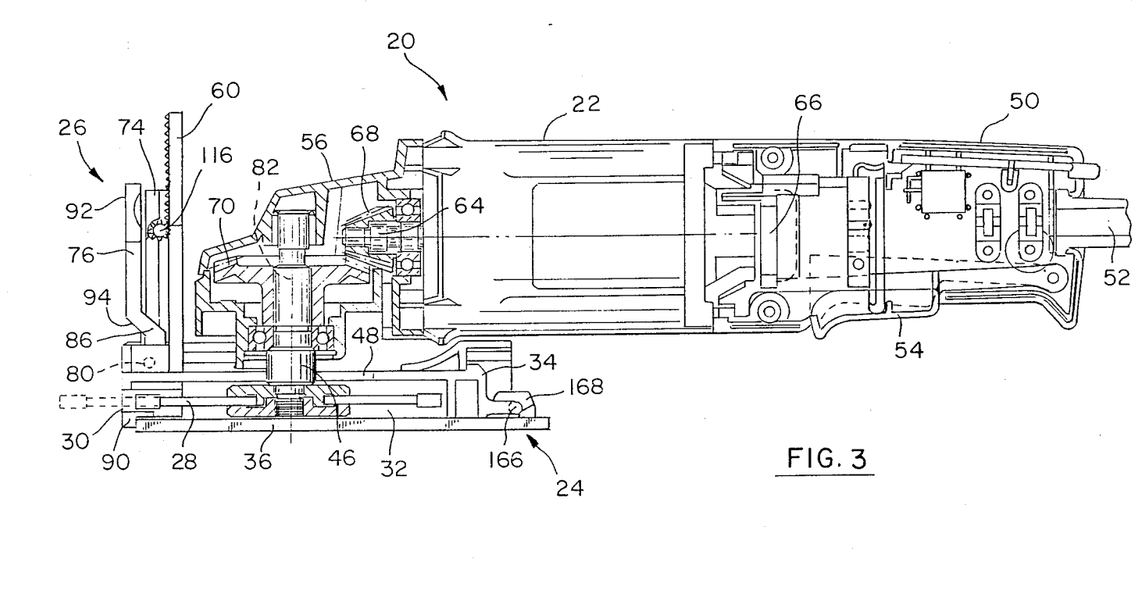
FIG. 3 is a view similar to FIG. 2 but partly in section and with the adjustable fence in an upwardly pivoted retracted position as in FIG. 1.

As shown in FIG. 3, the armature shaft 64 of an electric motor 66 carries at its forward end a small bevel gear 68 which meshes with a larger bevel gear 70 carried on the drive shaft 46 (see also FIG. 8). The bevel gears 68, 70 form a right-angle reduction drive from the motor 66 to the cutter blade 28. In use, as the shoe assembly 24 slides rearwardly relative to the housing 22 and its gear compartment 56, the drive shaft 46 moves along the longitudinal slot 48 (see also FIG. 8) with the cutter blade 28 protruding forwardly through the front transverse slot 30 as indicated in broken lines (see also FIGS. 2 and 5). The shoe assembly 24 is resiliently urged forwardly relative to the housing 22, 56, by a spring 72 (see FIGS. 2, 4 and 9) of the depth of cut adjustment mechanism 62. Thus, when the tool 20 is not being plunged forward for cutting, the cutting blade 28 is retracted completely within the base/shoe assembly 24, as shown in solid lines. Engageable shoulders or ribs are provided on the rear end of the base 34 and lower side of the motor housing 22 to form a stop to limit the rearward movement of the motor housing relative to the base, and so determine the retracted position of the cutter blade 28 inside the blade chamber 32 (see FIG. 3).

The adjustable fence assembly 26 will now be described in greater detail with reference to FIGS. 1 to 4, 6 and 7.

The fence assembly 26 comprises the stationary guide plate 60, a carrier 74 adjustably mounted on the guide plate 60 for sliding up and down (i.e. vertically in FIG. 2) thereon, and a fence 76 pivotally mounted on the carrier 74. The fence 76 pivots on a pair of pivot pins 78 about an axis 80 which is parallel to the plane of rotation of the disk-like cutter blade 28, i.e. parallel to the cutting plane, and at right angles to the axis of rotation of the drive shaft 46. Each pivot pin 78 passes through adjacent legs 84, 86 on the carrier 74 and fence 76. As can clearly be appreciated from FIGS. 2 and 6, the carrier legs 84 extend downwardly adjacent a front face of the carrier 74 into cavities 88 in the front wall 90 of the base 34, this front wall 90 actually being an integral downward extension of the guide plate 60; the cavities 88 enable the legs 84, and so the pivot pins 78 and their common pivotal axis 80, to be spaced a definite distance rearwardly from the front face of the base's front wall 90. Also, as clearly shown in FIGS. 2 and 3, the fence legs 86 are stepped backwards from the front face 92 of the fence 76, the legs 86 being spaced rearwardly from the main body of the fence 76 by rearwardly and downwardly (in FIG. 3) inclined portions 94. This arrangement of the legs 84, 86 and pivotal axis 80 enables the fence 76 to be pivoted 90 degrees clockwise from the fully extended horizontal position of FIG. 2 into an upright and fully withdrawn position of FIG. 3; in the upright position of FIG. 3, the front face 92 of the fence 76 is coplanar with the front face of the base's front wall 90. Thus, in the position of FIG. 3, a combined forwardly facing fence is in effect formed by the fence face 92 and the front face of the wall 90; the front of the blade opening 30 is also coplanar with this combined fence. The pivotal axis 80 of the fence is also parallel to the front face of the wall 90, this front face being perpendicular to the cutting plane of the blade 28.

The fence 76, on one side, has a rearwardly extending side wall 96 (see FIGS. 2 and 4) which is provided with an arcuate slot 98, the arc of which effectively extends through 90 degrees. A clamping screw 100 passes through the arcuate slot 98 and is screwed into a side of the carrier 74. The outer end of the screw 100 has a hand knob 102 which can be operated to clamp the fence side wall 96 to the carrier 74 in the extreme positions of FIGS. 2 and 3 or any angular position intermediate thereof. The ends of the arcuate slot 98 form, with the screw 100, stops for the two extreme arcuate positions of the fence 76, although separate adjustable stops may be incorporated for greater accuracy. In the position of FIG. 2, the face 92 of the fence 76 is parallel to the plane of the cutter blade 28, but spaced above the blade 28 as can be seen in FIG. 2; of course, this spacing is adjustable by moving the carrier 74 along the guide plate 60 as described below.

The carrier 74 has rearwardly extending side walls 104 (see FIGS. 1, 4 and 7) which have internal vertical grooves 106 (see FIG. 7) which slidably engage over vertical edge sections 108 of the guide plate 60. The front face of the guide plate 60 is formed with two parallel and spaced-apart toothed racks 110, the corresponding teeth of which are in alignment. The rear face of the front wall of the carrier 74 has a transversely extending, semi-circular sectioned channel 112 the ends of which communicate with access passages 114 in the carrier side walls 104. An elongated, small diameter pinion 116 (see FIGS. 3, 4 and 7) is rotatably located in the channel 112 with smooth end portions journalled in the forward ends of the access passages 114, these latter passages enabling the pinion 116 to be assembled in the carrier 74 from the rear thereof. One end of the pinion 116 extends through and just beyond the adjacent side wall 104, and carries a manually rotatable wheel 118 for rotating the pinion 116. The teeth of the pinion simultaneously engage the teeth of both racks 110, so that manual rotation of the wheel 118 causes the pinion to run up or down the racks 110 with consequential vertical movement of the carrier 74 up or down the guide plate 60. In this way, the distance of the carrier 74 above the shoe 36 can be accurately adjusted. As will be appreciated, by this arrangement the rotational axis 120 of the pinion 116 is selected and remains parallel to the plane of the cutter blade 28. Also, the pivotal axis 80 of the fence 76 is always parallel to the rotational axis 120 of the pinion 116. Thus, the front face 92 of the fence 76 is always parallel to the pinion axis 120, and in the fully extended position of FIG. 2, the fence front face 92 is always parallel to the plane of the cutter blade 28 regardless of the adjusted vertical position of the carrier 74. In other words, in all spacings of the fence front face 92 from the plane of the cutter blade 28 in the FIG. 2 position, the face 92 is automatically maintained parallel to the cutter blade. Also, when the fence front face 92 is set at any angle between 90 degrees and zero degrees, the fence face 92 intersects the plane of the cutter blade in a straight line parallel to the axis of the pinion 116 and to the front wall 90.

In any adjusted position of the carrier 74 relative to the guide plate 60, the carrier 74 is locked in position by a clamping plate 122 and clamping screw 124 carrying a clamping knob 126. The screw 124 passes freely through a bore in the plate 122 and threadedly engages in a blind bore 128 in a recess 130 in one of the sidewalls 104 of the carrier. The plate 122 engages against the guide plate edge section 108 engaged in the respective groove 106, so that tightening of the hand knob 126 clamps the respective guide plate edge section 108 between the forward wall of the respective groove 106 and the clamping plate 122. To adjust the height of the carrier 74 on the guide plate 60, the clamping knob 126 is loosened, the hand wheel 118 turned to accurately and precisely move the carrier 74, and then the clamping knob 126 re-tightened in the selected adjusted position. In FIG. 2, the extended position of the fence 76 closest to the plane of the blade 28 is shown in full lines, whereas in broken lines is shown the extended position of the fence when the carrier 74 is moved to its maximum position away from the blade 28.

The fence assembly 26, with the angular adjustability of the pivotal fence 76 through 90 degrees and the adjustability of the carrier 74 plus fence 76 up and down the guide plate 60, can be adjusted for use in making midwall, corner, miter and frame joints. Thus, the single fence assembly 26 is very versatile and can handle all usually required slot arrangements for making biscuit joints between two members, including edge joints, right angle joints, and T-like joints.

The depth of cut adjustment mechanism 62 will now be described in relation to FIGS. 2, 4 and 9 with some reference to FIGS. 8 and 10.

The mechanism 62 comprises a rod 132, threadedly engaged at a forward end into a boss 134 carried by the guide plate 60, and slidably engaged at a rear end in a flanged sleeve 136. Adjacent its forward end, the rod 132 is formed with an integral collar 138. The spring 72 coaxially surrounds the rod 132, and is retained and compressed between the rod collar 138 and the flange 140 of the flanged sleeve 136.

The sleeve 136 slidably engages through a bore in an ear-like flange 142 extending from the side of the motor housing 22. Manual rotation of the rod 132 via the collar 138 adjusts the length rod 132 projects rearwardly from the guide plate 60; this rod length influences the depth of cut as the rod is used to limit the depth of plunge cutting, as will be described further below. A locking nut 144 is used to lock this adjusted position of the effective length of the rod 132.

When the fence assembly 26 is engaged with a workpiece and the motor housing 22 is slid forwardly relative to the shoe assembly 24, the rear end of the rod 132 slides rearwardly through the sleeve 136 to enable the cutter blade 28 to pass through and protrude out of the front opening 30. The extent the blade 28 can protrude through the opening 30, and thus the depth of cut obtainable, is controlled by an adjustable turret stop 146. The turret stop 146 is rotatably mounted on the motor housing flange 142 via an axle pin 148 parallel to, but eccentric of, the rod 132. The turret stop 146 is provided around its periphery with a plurality of parallel recesses 150 of different axial depth. By manually rotating the stop 146 about its axle 148, any one of the axial recesses 150 can be selectively brought into register with the sleeve 136. Forward movement of the blade 28 through the opening 30 is stopped when the rear end of the rod 132 abuts the bottom (i.e. the rear closed end) of the selected recess 150 aligned with, and forming a continuation of, the sleeve 136. Thus, the depth of cut by the blade 28 is selectively adjustable by adjusting the rotational position of the turret stop 146. As illustrated in FIG. 9, the longest recess 150, which provides the maximum depth of cut, is in register with the rod 132.

Figure 10:
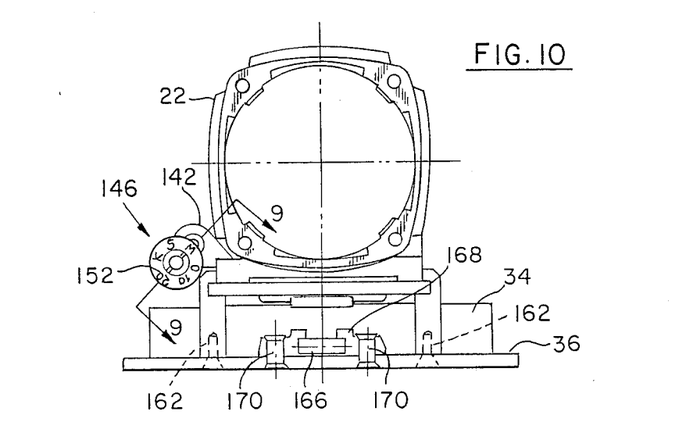
FIG. 10 is a diagrammatic section on the line 10—10 of FIG. 2.

FIG. 8 shows the turret stop mounted eccentrically of the spring 72 and rod 132, and FIG. 10 illustrates different depth of cut graduation 152 on the rear face of the turret stop 146.

The forward end of each recess 150 is flared outwardly to form a detent cavity 154. Correspondingly, the rear end of the sleeve 136 is tapered at 156 and, under the bias of the spring 72, is resiliently engageable in the respective detent cavity 154. As the turret stop 146 is adjustably rotated, the sleeve 136 is caused to lift out of the engaged detent cavity 154, against the action of the spring 72, with the sleeve flange 140 being displaced forwardly away from the flange 142. As soon as the next detent cavity 154 (of the next recess 150) is aligned with the sleeve 136, the spring 72 causes the tapered sleeve 156 end to engage in the detent cavity (and the flanges 140, 142 to re-engage). In this way, the turret stop is releasably latched in each selected adjustment, the sleeve 136 and the detent cavities 154 together with the spring 72 forming a latching means. It will be appreciated, therefore, that the spring 72 performs two functions; namely, retracting the cutter blade 28 within the blade chamber 32, and latching the selected depth of cut adjustment of the turret stop 146.

Figure 4:
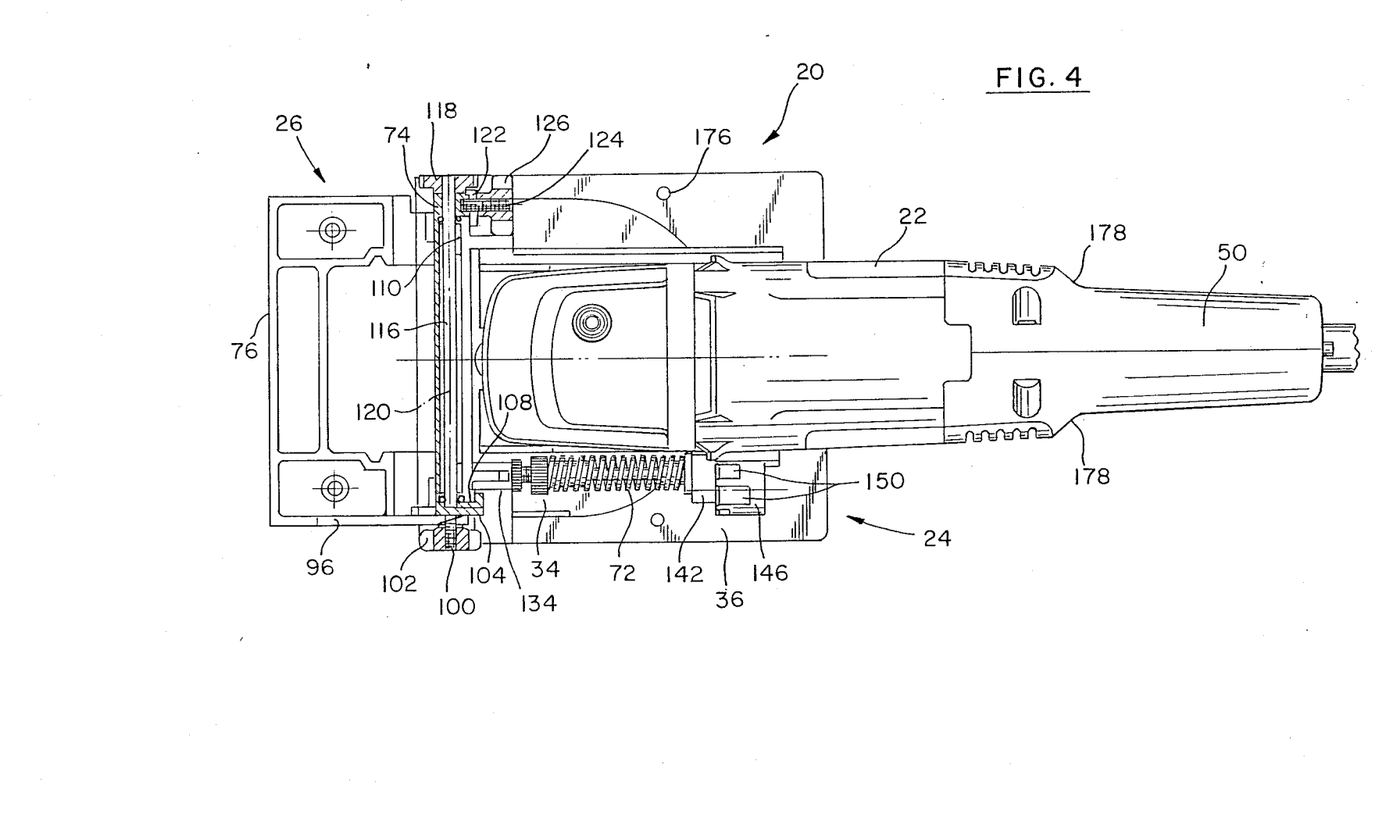
FIG. 4 is a top plan view of the biscuit jointer as in FIG. 2.
Figure 5:
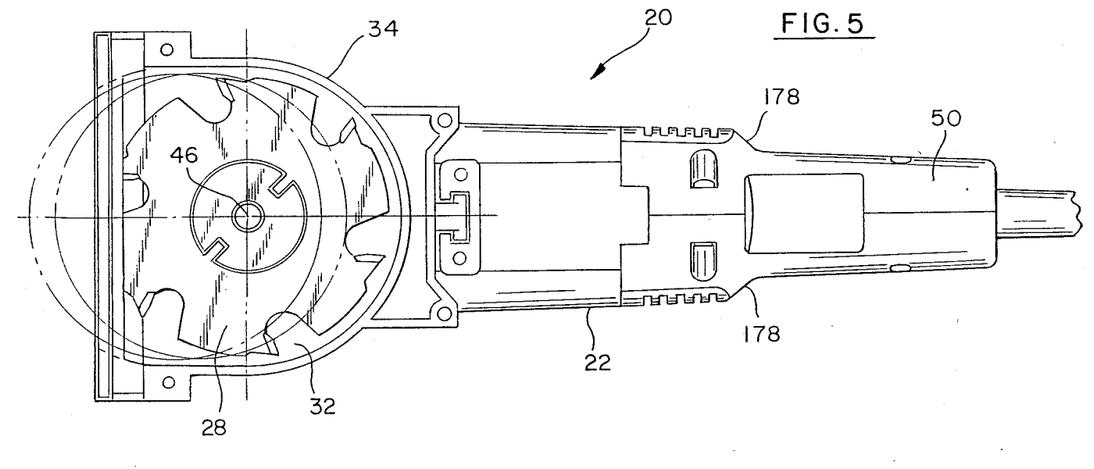
FIG. 5 is a bottom plan view of the biscuit jointer of FIG. 1 with a bottom shoe, and some other parts, omitted.
Figure 6:
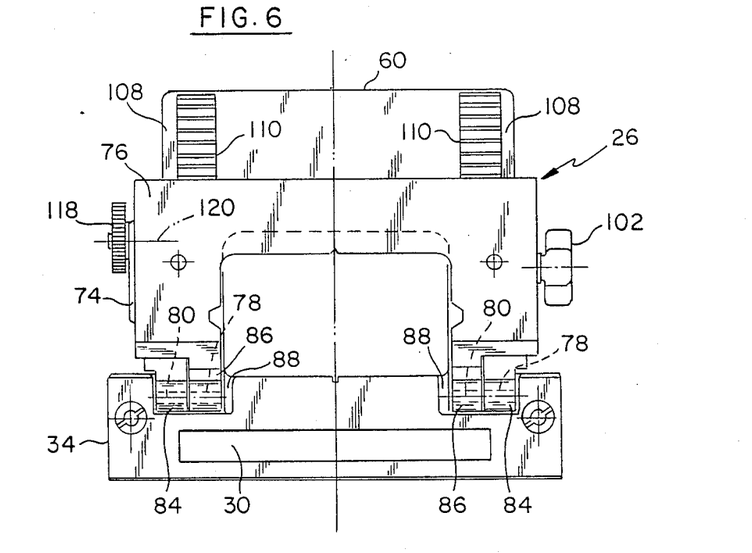
FIG. 6 is a front elevational view of the biscuit jointer as in FIG. 3.
Figure 9:
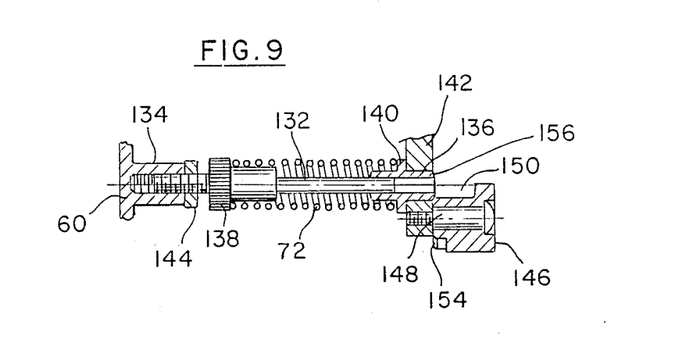
FIG. 9 is a section on the line 9—9 of FIG. 10 and illustrates a depth of cut adjustment mechanism.

As can be appreciated from FIGS. 4, 8 and 9, the recesses 150 extended axially along the cylindrical periphery of the turret stop 146, with each recess 150 being open outwards at the stop's cylindrical periphery. Each recess 150 is formed as a somewhat semi-circular cross-sectioned cavity having an open side facing radially away from the axis of rotation of the turret stop 146 (see FIG. 8), this open side being in addition to the open forward end which can be aligned with the latching sleeve 136. The purpose of the open sided recesses 150 is twofold. It enables visual inspection of the recesses to check their condition and that they are free from impeding debris. Also, by being open facing outwardly, the recesses 150 are self-clearing of sawdust, etc., such sawdust dropping or being shaken out during use and/or being pushed out when engaged by the rod 132. This arrangement provides a fairly simple depth of cut adjustment mechanism with improved reliability.

The mounting of the shoe 36 will now be described in relation to FIGS. 2, 3, 5, 10 and 11.

The shoe 36 has four mounting holes 160 (see FIG. 11) through which screws 162 are inserted to engage in threaded holes 164 (see FIG. 5) in the base 34. A hinge pin 166 is formed integrally with and spaced rearwardly of the rear of the base 34. The pin 166 is parallel to the fence pivotal axis 80. A hinge pin retainer 168 is riveted to the rear of the upper side of the shoe 36 by rivets 170 passing through holes 172 in the retainer 168 and registering holes 174 in the shoe 36. The hinge pin 166 is captured between the retainer 168 and the shoe 36 before the screws 162 are inserted and secured. This arrangement enables complete access to the blade chamber 32 for easy and thorough cleaning thereof, and also facilitates blade changing. The four screws 162 are simply removed with a screw driver, and then the shoe allowed to pivot open under its own weight about the hinge pin 166. When cleaning or blade changing is completed, the shoe is pivoted closed and then the four screws 162 re-inserted and tightened. This shoe pivoting feature ensures that the shoe is correctly orientated and in register when presented for re-securing.

Figures 7, 11, 12:
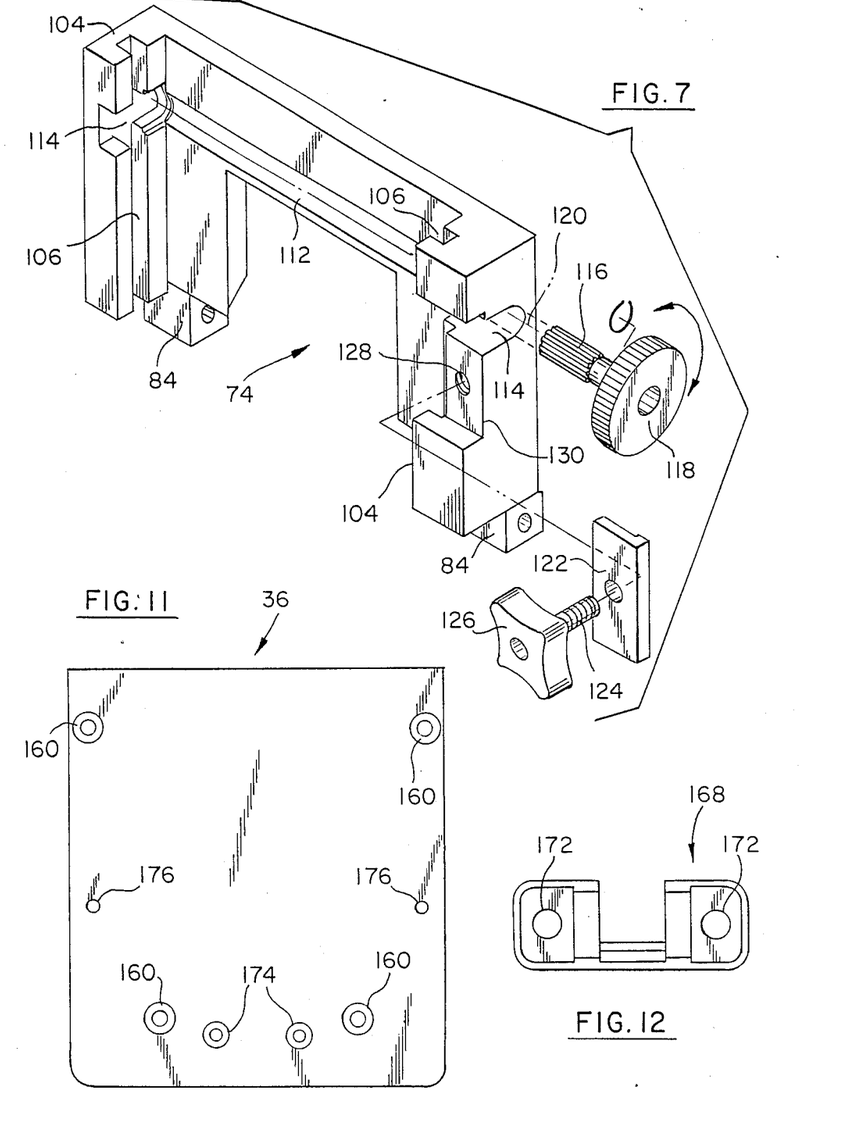
FIG. 7 is an exploded view from the rear of a slidably adjustable carrier member, and related components, of the fence assembly of the biscuit jointer.
FIG. 11 is an underneath plan view of the bottom shoe of the biscuit cutter.
FIG. 12 is a top plan view of a hinge pin retainer which is attached to the upper side of the bottom shoe of FIG. 11.

As can be seen in FIGS. 1, 4 and 11, the shoe 36 is also provided with attachment holes 176, preferably one on each side just outside the base 34 (see FIG. 4). These holes 176 can be used to attach the shoe 36 with screws or bolts to a bench, or other work surface, to convert the tool to a bench mounted biscuit jointer. Slots may more accurately be positioned in a workpiece with the bench mounted tool, particularly slots that are more difficultly positioned for cutting accurately.

Another feature of the shoe 36 and shoe assembly 24 is that clampable areas are provided on each side of the base 34, for example, in the vicinity of the holes 176. As can readily be appreciated from FIGS. 1 and 4, the flat plate-like shoe 36 extends a substantial distance laterally outwardly past the side walls of the base 34. This provides a flat exposed area on the upper surface of the shoe 36 on each side of the tool, this flat area being readily engageable by a screw clamp to clamp the shoe 36 to a bench top. Thus, an alternative manner of securing the biscuit jointer 20 to and on a work surface is to clamp the flat exposed portions of the shoe 36 to the work surface with a pair of clamps.

In use, the desired depth of cut is adjusted by selecting the appropriate recess of the turret stop 146, and also adjusting the screwing of the rod 132 into the boss 134 in those cases when additional fine adjustment is desired. The fence assembly 26 is adjusted to give the desired angular position of the fence 76 from zero to ninety degrees, and to provide the desired distance of the fence 76 back from the plane of the cutter blade. The handle 50 (and/or motor housing 22) is then grasped by hand, the fence 76 and front wall 90 placed against the workpiece in the appropriate position, the trigger switch 54 actuated, and the handle 50 and housing 20 pushed forwardly to cause the rotating blade 28 to make the desired plunge cut. The handle 50 and housing 20 can then be allowed to return under the action of the spring 72, the trigger switch released, and the biscuit jointer removed to make the next cut.

For ease of repeated operation, and reduction in any hand fatigue, when making a series of slot cuts, the handle 50 is formed as a reduction in cross-section of the main body of the motor housing 22. This can readily be appreciated from FIGS. 1, 4 and 5. As seen in top and bottom plan view in FIGS. 4 and 5, the handle 50 is necked down from the main motor housing 22 with shoulders 178 at the forward end of the handle 50. Also, as can be seen in side view in FIG. 2, the lower surface of the handle 50 is stepped upwardly from the lower surface of the main body of the motor housing 22, this lower stepping occurring at the forward end of the trigger switch 54. Thus, when the trigger is depressed by an index finger this finger can rest against a lower shoulder 180 at the forward end of the handle 50. In use, when pushing the handle 50 forwardly, the hand grasping the handle 50 engages the shoulders 178, 180 to facilitate the pushing action. This allows the hand to relax more while holding the handle so reducing fatigue. Further, a smaller cross-sectioned handle is provided which is easier and less tiring to grip.

It will be appreciated from the foregoing that advantageously the fence 76 is adjustable in height relative to the base shoe 27 and may be angularly adjusted between a zero degree angle for face cuts and a ninety degree angle for edge cuts.

Another advantage of the above embodiment is that because a compound single fence assembly is used, the fence assembly need not be readjusted in height when a succession of edge and face cuts are made. For example, if an edge cut is to be made followed by a face cut and then followed by an edge cut, etc., the height of the fence need not be changed—unless it is desired to change to a different spacing of the fence from the cutter for a different width of material. Thus making repeatable cuts is simplified and set up time is reduced.

A further advantage in the illustrated embodiment is the rack and pinion arrangement for the height adjustment of the fence. This rack and pinion adjustment ensures that the pivotal axis of the fence always remains parallel to the base shoe and perpendicular to the axis of rotation of the blade. Also, finer and very controllable height adjustment is made possible.

The above described embodiments, of course, are not to be construed as limiting the breadth of the present invention. Modifications, and other alternative constructions, will be apparent which are within the spirit and scope of the invention as defined in the appended claims.

What is claimed is:

1. A biscuit jointer cutter, comprising:
   a housing containing a motor;
   a shoe assembly containing a cutter blade rotatably driven by said motor;
   said shoe assembly having an opening through which said blade is protrudable in a forward direction and retractable in a rearward direction;
   said housing and said shoe assembly being movable to and fro relative to each other to cause said blade to protrude through and be retracted back through said opening, said blade being so movable in a cutting plane;
   a fence assembly comprising a guide plate secured to said shoe assembly, a carrier movably mounted on said guide plate for adjustment away from and towards said cutting plane, and a fence pivotally mounted on said carrier to pivot about a pivotal axis;
   said pivotal axis being located rearward of said opening in said rearward direction; and
   said fence being pivotal between an extended position parallel to said cutting plane and a withdrawn position at right angles to said cutting plane, said fence in said withdrawn position not protruding in said forward direction beyond said opening.

2. The cutter of claim 1, wherein said carrier is slidably mounted on said guide plate for movement at right angles to said cutting plane.

3. The cutter of claim 2, wherein said carrier has grooves which slidably engage with edge sections of said guide plate.

4. The cutter of claim 3, wherein said carrier has a clamping plate for releasably clamping said carrier to said guide plate.

5. The cutter of claim 1, further comprising means for moving said carrier on said guide plate to effect said adjustment of said carrier.

6. The cutter of claim 5, wherein said moving means comprises a rack and pinion mechanism.

7. The cutter of claim 6, wherein the rack is formed on one of said guide plate and said carrier, and the pinion is rotatably mounted in the other of said guide plate and said carrier.

8. The cutter of claim 7, wherein said pinion is elongate and extends fully across said guide plate parallel to said pivotal axis.

9. The cutter of claim 7, wherein rack teeth engage opposite end portions of said pinion.

10. The cutter of claim 9, wherein said pinion is mounted in said carrier, and two racks, spaced apart along said pinion, are formed on said guide plate, each of said racks being adjacent a respective edge section of said guide plate.

11. The cutter of claim 1, wherein said fence has a front face on a fence body and rearwardly displaced legs, said pivotal axis passing through distal ends of said legs.

12. The cutter of claim 11, wherein said distal ends are located in cavities in a front wall of said shoe assembly, and said legs locate said pivotal axis rearwardly of and parallel to said fence body.

13. The cutter of claim 1, further comprising a depth of cut adjustment mechanism operatively connected between said shoe assembly and said housing.

14. The cutter of claim 13, wherein said depth of cut adjustment mechanism comprises rod movable in unison with one of said shoe assembly and said housing and slidable with respect to the other of said shoe assembly and said housing.

15. The cutter of claim 14, wherein a turret stop is adjustably rotatable about a rotational axis parallel to but eccentric of said rod.

16. The cutter of claim 15, wherein said turret stop has a plurality of stop recesses of different length in a direction parallel to said rotational axis, and each of said stop recesses is selectively alignable with said rod to provide different stop positions of said rod when said blade is caused to protrude through said shoe assembly opening.

17. The cutter of claim 16, further comprising a coil spring coaxial with said rod and operatively connected between said shoe assembly and said housing to urge said blade to retract in said rearward direction.

18. The cutter of claim 17, wherein a latch member is yieldably engageable with detents on said turret stop to releasably latch said turret stop in the stop positions selected, and said coil spring resiliently urges said latch member into engagement with the respective detent.

19. The cutter of claim 16, wherein each said recess has an open longitudinal side which is open outwardly in a direction radially outwardly from said rotational axis.

20. The cutter of claim 1, wherein said shoe assembly comprises a base having a blade chamber for containing said blade, a shoe extending across said blade chamber and upon which said cutter can be supported, said shoe being pivotally attached to said base and being pivotal between positions opening and closing said blade chamber, and means for securing said shoe in said closed position.

21. The cutter of claim 20, wherein said securing means comprises at least one screw.

22. The cutter of claim 20, wherein said base has a hinge pin supported adjacent a rear wall of said base, and said hinge pin is captured in a hinge pin retainer mounted on an upper surface of said shoe.

23. The cutter of claim 1, wherein said shoe assembly comprises a shoe upon which said cutter can be supported on a work surface, and a base having a blade chamber and being connected to said shoe, said shoe having two screw holes located outside said base for attaching said shoe with screws to said work surface.

24. A biscuit jointer cutter, comprising:
a housing supporting a motor;
a shoe assembly enclosing a cutter blade driven by said motor;
said shoe assembly having a front opening through which said blade is movable in a forward direction for cutting and retractable in a rearward direction after cutting;
said housing and said shoe assembly being reversibly movable relative to each other to effect said blade moving out through said opening for cutting and retracting after cutting;
a depth of cut adjustment mechanism operatively connected between said shoe assembly and said housing;
said mechanism comprising a stop member movable to selected positions to adjust the distance said blade can move out through said opening for cutting, a latch member for yieldably latching said stop member in said selected positions, and a spring resiliently biasing said latch member to effect said latching; and
said spring being operatively connected between said shoe assembly and said housing to also urge said blade to retract through said opening in said rearward direction.

25. The cutter of claim 24, wherein said mechanism includes a rod movable in unison with one of said shoe assembly and said housing and slidable relative to the other of said shoe assembly and said housing, said rod engaging said stop member to stop movement of said blade out through said opening.

26. The cutter of claim 25, wherein said stop member is rotatable about an axis and has a plurality of stop recesses of different length in the direction of said axis, and each of said stop recesses is selectively registrable with an end of said rod to provide different stop positions of said rod.

27. The cutter of claim 26, wherein each said recess has an open longitudinal side which opens outwardly in a direction radially outwardly from said axis.

28. The cutter of claim 27, wherein said axis is parallel to but eccentric of said rod.

29. The cutter of claim 25, wherein said spring is a coil spring surrounding said rod, said spring being compressed between a collar on said rod and a flange on a sleeve through which said rod is slidable.

30. The cutter of claim 29, wherein said sleeve comprises said latch member.

31. The cutter of claim 25, wherein a free end of said rod is engageable with said stop, and the opposite end of said rod is adjustably screwed into said one of said shoe assembly and said housing for altering the length of the rod extending from said one of said shoe assembly and said housing.

32. A biscuit jointer cutter, comprising:
a housing supporting a motor;
a shoe assembly housing a cutter blade rotatably driven by said motor, and having a front opening through which said blade is movable in a forward direction for cutting and retractable in a rearward direction after cutting;
said housing and said shoe assembly being reversibly movable relative to each other to effect said blade moving out through said opening for cutting and retracting after cutting;
said shoe assembly comprising a base having a blade chamber for housing said blade, and a shoe extending across said blade chamber and upon which said biscuit jointer cutter can be supported;
said shoe being pivotally attached to said base and being pivotal between positions closing and opening said blade chamber; and
means for securing said shoe in said closed position.

33. The cutter of claim 32, wherein said securing means comprises at least one screw.

34. The cutter of claim 32, wherein said securing means comprises a plurality of screws engageable in threaded bores in said base around said blade chamber.

35. The cutter of claim 32, wherein said base has a hinge pin located centrally adjacent a rear wall of said base, and said hinge pin is captured in a hinge pin retainer mounted on said shoe.

36. The cutter of claim 32, wherein said shoe has two screw holes located outside said base on opposite sides thereof for attaching said shoe with screws to a work surface to convert said cutter to a bench tool.

37. The cutter of claim 32, wherein said shoe comprises a plate which, when in the position closing said blade chamber, extends outwardly beyond a peripheral side wall of said base to provide a flat exposed upper surface portion of said shoe, said flat exposed portion forming a clamping area by which said shoe can be clamped to a worksurface.

38. The cutter of claim 37, wherein a said flat exposed portion of said shoe is provided to each side of said base.

* * * * *